United States Patent
Thurlapati et al.

(10) Patent No.: US 12,349,183 B2
(45) Date of Patent: Jul. 1, 2025

(54) USER EQUIPMENT AND METHOD FOR PERFORMING COLLISION FREE COMMUNICATION

(71) Applicant: SAMSUNG ELECTRONICS CO., LTD., Suwon-si (KR)

(72) Inventors: Narasimha Rao Thurlapati, Karnataka (IN); Siva Prasad Gundur, Karnataka (IN); Sapan Pramodkumar Shah, Karnataka (IN); Kiran Gajula, Karnataka (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 448 days.

(21) Appl. No.: 17/836,312

(22) Filed: Jun. 9, 2022

(65) Prior Publication Data

US 2022/0400494 A1    Dec. 15, 2022

(30) Foreign Application Priority Data

Jun. 9, 2021   (IN) .............................. 202141025738
May 26, 2022  (IN) .............................. 202141025738

(51) Int. Cl.
*H04W 4/00*      (2018.01)
*H04W 72/0446*   (2023.01)
*H04W 72/56*     (2023.01)

(52) U.S. Cl.
CPC ....... *H04W 72/56* (2023.01); *H04W 72/0446* (2013.01)

(58) Field of Classification Search
CPC . H04W 72/56; H04W 72/0446; H04W 28/04; H04W 72/04; H04W 72/042;
(Continued)

(56) References Cited

U.S. PATENT DOCUMENTS 7,266,085 B2 *  9/2007  Stine .................... H04W 74/08
                                                       370/461
9,860,874 B2 *  1/2018  Jung .................... H04W 72/04
(Continued)

FOREIGN PATENT DOCUMENTS

WO    2016/161599        10/2016
WO    WO-2016161599 A1 *  10/2016  .............. H04W 4/10

OTHER PUBLICATIONS

Indian Office Action issued Jan. 20, 2023 in corresponding Indian Patent Application No. 202141025738.

*Primary Examiner* — Phuongchau Ba Nguyen
(74) *Attorney, Agent, or Firm* — NIXON & VANDERHYE P.C.

(57) ABSTRACT

Embodiments herein provide a user equipment (UE) and a method for performing communication in a mission critical services (MCX) off-network. The method includes: sending an announcement message for a slot reservation for a complete scheduling assignment (SA) cycle; determining whether a second UE in the MCX Off-network is trying to reserve same slot and having a higher priority than priority of the first UE. Further, the method includes performing one of: backing off and sending a new announcement message for the slot reservation in response to determining that the second UE is trying to reserve a same slot and has the higher priority than the priority of the first UE, and reserving the same slot in response to determining that the second UE is trying to reserve the same slot and the second UE has a lower priority than the priority of the first UE.

14 Claims, 12 Drawing Sheets

(58) Field of Classification Search
CPC ... H04W 88/08; H04W 28/08; H04W 28/084; H04W 36/22; H04W 72/12; H04L 5/0007
See application file for complete search history.

(56) References Cited

U.S. PATENT DOCUMENTS

| | | | |
|---|---|---|---|
| 2013/0208707 A1* | 8/2013 | Sakoda | H04W 72/0446 |
| | | | 370/336 |
| 2015/0271786 A1* | 9/2015 | Xue | H04W 74/0816 |
| | | | 370/329 |
| 2018/0206260 A1 | 7/2018 | Khoryaev et al. | |
| 2018/0254820 A1* | 9/2018 | Chae | H04W 4/70 |
| 2020/0112972 A1 | 4/2020 | Nguyen et al. | |
| 2020/0113000 A1 | 4/2020 | Chang et al. | |
| 2020/0137531 A1 | 4/2020 | Gupta et al. | |
| 2021/0329596 A1* | 10/2021 | Freda | H04W 28/0268 |

\* cited by examiner

USER EQUIPMENT AND METHOD FOR PERFORMING COLLISION FREE COMMUNICATION

CROSS-REFERENCE TO RELATED APPLICATIONS

This application is based on and claims priority under 35 U.S.C. § 119 to Indian Provisional Patent Application No. 202141025738, filed on Jun. 9, 2021, in the Indian Patent Office, and an Indian Complete patent application number 202141025738, filed on May 26, 2022, in the Indian Patent Office, the disclosures of each of which are incorporated by reference herein in their entireties.

BACKGROUND

Field

The disclosure relates to a user equipment, and for example to the user equipment and method for performing collision free communication in a mission critical services (MCX) Off-network.

Description of Related Art

In general, mission critical data (MCDATA) services require reliable communications and cannot afford packet loss. Deploying the MCDATA services for group communication (from one device to many devices) in a mission critical services (MCX) off-network is difficult due to collisions in channel access and lack of a feedback mechanism. Further, the packet loss is high in mode-2 direct communications as data is broadcasted without getting feedback.

A conventional method provides channel access mechanisms for the MCX off-network however it failed to address heterogeneous application channel access requirements. For example, a public safety application has different set of requirements with respect to packet loss when compared to a gaming application. Hence, new solutions are required to support channel access requirements for the MCX off-network to handle packet loss sensitive applications.

Other conventional methods failed to address the packet loss by providing priority channel access to certain users in the MCX off-network.

Thus, it is desired to address the above mentioned disadvantages or other shortcomings or at least provide a useful alternative.

SUMMARY

Embodiments of the disclosure provide a user equipment and a method for performing collision free communication.

Embodiments of the disclosure reserve a slot in response to determining that other UE trying to reserve the slot and has lower priority than the priority of a first UE.

Embodiments of the disclosure share the reserved slot with the other UE by the first UE in response to determining that the slot is already reserved by other UE in the MCX Off-network.

Embodiments of the disclosure may utilize a same slot continuously for communication in response to determining that the other UE reserved the same slot and has lower priority than the priority of the first UE.

Embodiments of the disclosure may override the reserved slot in response to determining that the other UE has priority lower than the priority of the first UE.

Accordingly an example embodiment provides a method for performing communication in a mission critical services (MCX) off-network. The method includes: sending an announcement message for a slot reservation for a complete scheduling assignment (SA) cycle; determining whether second UE in the MCX Off-network is trying to reserve a same slot and having a higher priority than a priority of the first UE; performing one of: backing off and sending a new announcement message for the slot reservation in response to determining that the second UE trying to reserve a same slot and has the priority higher than the priority of the first UE, and reserving the same slot in response to determining that the second UE trying to reserve the same slot and has a lower priority than the priority of the first UE.

Accordingly various example embodiments herein disclose a first UE for performing communication in a mission critical services (MCX) off-network. The first UE includes: a memory, at least one processor, and a service management controller coupled to the memory and the processor. The service management controller is configured to: send an announcement message for a slot reservation for a complete scheduling assignment (SA) cycle; determine whether a second UE in the MCX Off-network is trying to reserve a same slot and having a higher priority than the priority of the; back off and send a new announcement message for the slot reservation in response to determining that the second UE trying to reserve the same slot and has the higher priority than the priority of the UE; and reserve the same slot in response to determining that the second UE is trying to reserve the same slot and has a lower priority than the priority of the UE.

These and other aspects of the various example embodiments herein will be better appreciated and understood when considered in conjunction with the following description and the accompanying drawings. It should be understood, however, that the following descriptions, while indicating various example embodiments and numerous specific details thereof, are given by way of illustration and not of limitation. Many changes and modifications may be made within the scope of the disclosure, and the embodiments herein include all such modifications.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
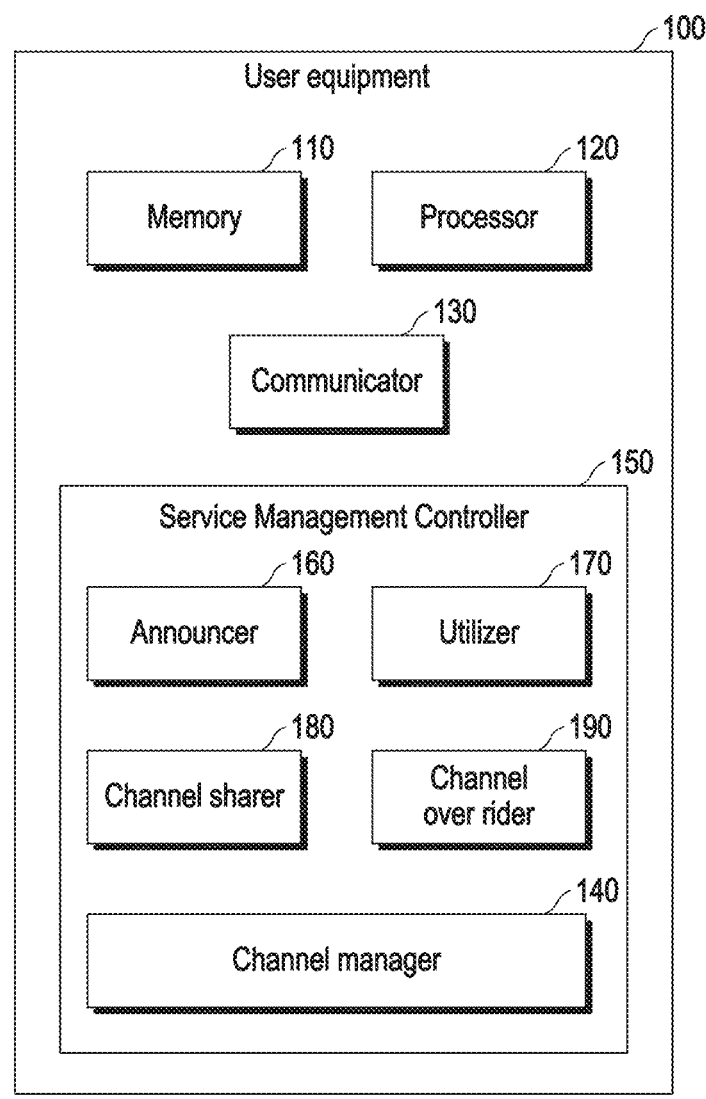
FIG. 1 is a block diagram illustrating an example configuration of a user equipment for performing the collision free communication in the MCX off-network, according to various embodiments.

The various example embodiments herein and the various features and advantageous details thereof are explained more fully with reference to the non-limiting embodiments that are illustrated in the accompanying drawings and detailed in the following description. Descriptions of well-known components and processing techniques may be omitted so as to not unnecessarily obscure the disclosure herein. Also, the various example embodiments described herein are not necessarily mutually exclusive, as various embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

The various example embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits of a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Third generation partnership project (3GPP) has adopted a proximity services (ProSe) framework in a technical specification 23.303 as an underlying mechanism for realizing a side link device to device (D2D) in a MCX and choosing a broadcast over a side link (PC5 interface) channel mechanism where a hybrid automatic repeat request (HARQ) feedback is difficult to use due to practical limitations. In this out of band D2D, there is no central coordinator, a user equipment (UE) are pre-configured with a set of resource pools for transmission and reception over a side link channel.

The 3GPP mission critical services (MCX) proposes mission-critical push-to-talk over LTE (MCPTT), mission critical video (MCVideo), and mission critical data (MCData) communications. The MCDATA service requires reliable communications and cannot afford packet loss. Deploying such service in Off-network is difficult due to collisions and lack of feedback mechanism in conventional systems. Also, a MCX dispatcher holds critical priority communication demanding a collision-free environment for urgent communication. Current MAC addresses only partial requirements as part of priority scheduling inside the UE.

Thus new approaches are required to support packet loss sensitive services in random environment and addressing the user priority in channel access.

The disclosure provides a method to reserve channel slots in a strategically effective way and share such slots with coordination between the UEs, if such multiple communications are present in a particular zone at the same time.

The disclosed method provides a provision to override an already chosen data transmission block of regular communications for priority communications, which ensures controlled latency and bandwidth usage for sending the priority data.

Accordingly various example embodiments provide a method of collision free communication in feedback less medium access control (MAC) protocol. The disclosed method provides a slot reservation mechanism to avoid collisions in a PSCCH, so that the MCDATA communications are feasible even in one-to-many broadcasts. Further, the disclosed method provides channel overriding mechanism by which the dispatcher can acquire more channel resources to transfer critical data reliably with low latency.

Off Network MCX services require reliable communication, but current channel access mechanism is prone to the collision in the channel access, there by packet loss is evident. Also, the MCX service uses a one-to-many communication, by implementing a HARQ feedback (packet success/failure) to a source, which is not practical. Also, the MCX services require the priority channel access to certain users, which cannot be provided by current channel access.

There is a need of a mechanism which can handle collision free decentralized channel access mechanism which also can provide priority channel access to certain users. The disclosed method provides a novel and efficient well tested slot reservation mechanism to avoid the collisions in a PSCCH so that MCDATA communications are feasible even in one-many broadcast with no packet loss. Further, the disclosed method provides channel overriding mechanism by which the dispatcher can acquire more channel resources to transfer the critical data reliably with low latency.

The MCX provides large group communications with stringent KPIs of reliability and latency for first responders, in both on network and off network. The disclosed system provides mechanism to have different priority for the users and communications with wide variety of services like voice, video, messaging and file distribution. The disclosed system has following:

User priority: In MCX, communications from priority users is critical, for example a broadcast message from a dispatcher. Current MAC doesn't provide mechanism to handle user priority in channel access where urgent messages need to be delivered by dispatcher by utilizing more bandwidth and should reach all receivers without collision.

Reliable versus real time: In MCX, voice/video communication need to be real time and packet loss tolerable up to certain limit, while, File Distribution and messaging doesn't need to be real time but require more reliability. A single Channel access mechanism needs to support these 2 requirements.

Half Duplex Media Transfer: In MCX one-to-many communications, generally only one or two UEs have authority to transfer media at given time instance, which those UEs continue to transmit for certain time. In such cases, contending for channel for every packet is burden and current medium access doesn't capitalize on this behavior. It gives same priority for channel access for all the UEs which are doing continuous transmission and occasional transfer.

In the Off-network, devices are designed to use single application (MCX) but current channel access does not cater to specific application requirements. MCX application requirements are given in Table 1.

TABLE 1

MCX application requirements

|  | One-one (Private communications) | One-Many (Group communications) |
|---|---|---|
| Real Time (latency critical) Ex: Voice, Video | Packet priority and scheduling in device Introduction of Mode-4 (for V2X in 5G) No coordination between devices. Random channel access | Packet priority and scheduling in device. Introduction of Mode-4 (for V2X in 5G) No coordination between devices. Random channel access |
| Reliability (loss sensitive, Non Real time) Ex: Messaging, File transfer | Application feedback possible. No HARQ feedback. | No HARQ feedback. Application feedback not feasible |
| Address User priorities Ex: Dispatcher | No Support | No Support |
| Capitalize on Half duplex media | No Support | No Support |

Referring now to the drawings and more particularly to FIGS. 1 through 13, where similar reference characters denote corresponding features consistently throughout the figures, there are shown various example embodiments, FIG. 1 is a block diagram illustrating an example configuration of a user equipment for performing the collision free communication in the MCX off-network, according to various embodiments.

Referring to FIG. 1, examples of the user equipment (100) include, but are not limited to a laptop, a palmtop, a desktop, a mobile phone, a smartphone, personal digital assistant (PDA), a tablet, a wearable device, an internet of things (IoT) device, a virtual reality device, a foldable device, a flexible device, an immersive system, etc.

In an embodiment, the user equipment (100) includes a memory (110), a processor (e.g., including processing circuitry) (120), a communicator (e.g., including communication circuitry) (130) and a service management controller (e.g., including various processing circuitry and/or executable program instructions) (150).

The memory (110) stores instructions to be executed by the processor (120). The memory (110) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (110) may, in some examples, be considered a non-transitory storage medium. The term "non-transitory" may indicate that the storage medium is not embodied in a carrier wave or a propagated signal. However, the term "non-transitory" should not be interpreted that the memory (110) is non-movable. In various examples, the memory (110) can be configured to store larger amounts of information than its storage space. In various examples, a non-transitory storage medium may store data that can, over time, change (e.g., in random access memory (RAM) or cache). The memory (110) can be an internal storage unit or it can be an external storage unit of the user equipment (100), a cloud storage, or any other type of external storage.

The processor (120) may include various processing circuitry and is configured to execute instructions stored in the memory (110). The processor (120) may be a general-purpose processor, such as a central processing unit (CPU), an application processor (AP), or the like, a graphics-only processing unit such as a graphics processing unit (GPU), a visual processing unit (VPU) and the like. The processor (120) may include multiple cores to execute the instructions.

The communicator (130) may include various communication circuitry and is configured for communicating internally between hardware components in other user equipment or server. Further, the communicator (130) is configured to facilitate the communication between the user equipment (100) and other devices via one or more networks (e.g. radio technology). The communicator (130) includes an electronic circuit specific to a standard that enables wired or wireless communication.

The service management controller (150) is implemented by processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like.

In an embodiment, off-network the service management controller (150) may include an announcer (160), a utilizer (170), a channel sharer (180), and a channel over rider (190), and a channel manager (140).

The announcer (160), the utilizer (170), the channel sharer (180), the channel over rider (190) and the channel manager (140) are implemented by processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like.

The service management controller (150) sends the announcement message for the slot reservation for the complete SA cycle. In an embodiment, the announcement message is sent with an announcement probability in each SA cycle in non-configured slots. The service management controller (150) determines whether the second UE in the MCX off-network is trying to reserve same slot and having priority higher than the priority of the first UE. The service management controller (150) backs off and sends the new announcement message for the slot reservation in response to determining that the second UE trying to reserve the same slot and has priority higher than the priority of the first UE. The service management controller (150) reserves the slot in response to determining that the second UE trying to reserve the same slot and has lower priority than the priority of the first UE.

The service management controller (150) determines whether the slot is already reserved by second UE in the MCX off-network. In an embodiment, reserve the slot in response to determining that the slot is not already reserved by second UE in the MCX off-network, and transmitting data by the first UE using the reserved slot for the complete SA cycle with a transmitting probability in each SA. In an embodiment, share the reserved slot with the second UE in response to determining that the slot is already reserved by second UE in the MCX off-network.

The service management controller (150) send a slot sharing request for a slot configuration in the non-configured slots to the second UE that reserved the same slot. In an embodiment, the service management controller (150) determines whether a slot sharing response is received from the second UE that reserved the same slot. In an embodiment, share the reserved slot with the second UE in response to receiving the slot sharing response from the second UE that reserved the same slot and back off by the first UE and sending a new announcement message for the slot reservation in response to receiving the slot sharing response from the second UE that reserved the same slot.

The service management controller (150) sends the announcement message for the slot reservation for the complete SA cycle with the announcement probability in each SA cycle in non-configured slots. In an embodiment, the service management controller (150) reserve the slot after sending announcement message for the SA cycle and utilize the reserved slot for a data announcement for a next complete SA cycle with the transmitting probability in each SA cycle. In an embodiment monitor whether the second UE reserved the same slot and having priority higher than the priority of the first UE and perform back off and send the new announcement message for the slot reservation in response to determining that the second UE reserved the same slot and has priority higher than the priority of the first UE; and utilize the same slot continuously in response to determining that the second UE reserved the same slot and has lower priority than the priority of the first UE.

The service management controller (150) detects the critical data to be transmitted in the channel and determine the slot is already reserved by the second UE in the MCX off-network. In an embodiment, the service management controller (150) override the reserved slot in response to determining that the second UE has priority lower than the priority of the first UE, and back off and sending the new announcement message for the slot reservation in response to determining that the second UE reserved the same slot and has priority higher than the priority of the first UE.

The service management controller (150) detects the critical data to be transmitted in the channel and send an announcement message for the complete SA cycle. In an embodiment, the service management controller (150) reserve a control channel positioned at an end of a control block of a SA period of the SA cycle. In an embodiment, the service management controller (150) override the control channels announced by the second UE has priority lower than the priority of the first UE; and utilize more data channel resources in response to overriding the control channels.

Although FIG. 1 shows the hardware components of the user equipment (100) it is to be understood that other embodiments are not limited thereon. In other embodiments, the user equipment (100) may include less or a greater number of components. Further, the labels or names of the components are used only for illustrative purpose and does not limit the scope of the disclosure. One or more components can be combined together to perform same or substantially similar function for performing the collision free communication in the MCX off-network.

The embodiments disclosed herein can be implemented using at least one hardware device and performing network management functions to control the elements.

Figure 2:
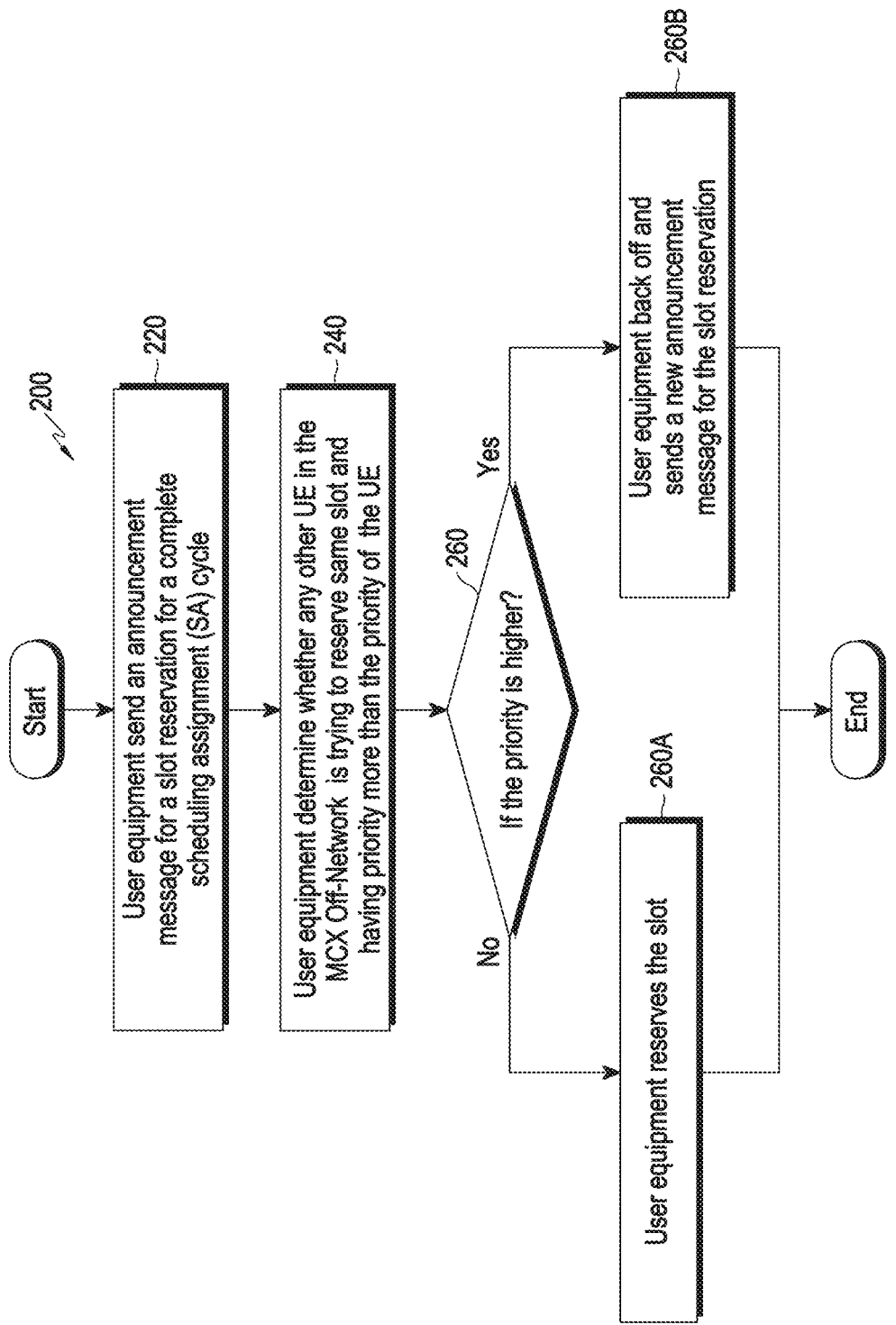
FIG. 2 is a flowchart illustrating an example method for performing collision free communication in a MCX off-network, according to various embodiments.

FIG. 2 is a flowchart illustrating an example method for performing collision free communication in a MCX off-network, according to various embodiments.

In the flowchart (200), At operation 220, the UE sends an announcement message for a slot reservation for a complete scheduling assignment (SA) cycle, At operation 240, User equipment determine whether other UE in the MCX Off-network is trying to reserve same slot and having priority higher than the priority of the UE, At operation 260A, User equipment perform reserve the slot in response to determining in operation 260 that the second UE trying to reserve the same slot and has lower priority than the priority of the first UE.

At operation 260B, User equipment perform back off and sending a new announcement message for the slot reservation in response to determining in operation 260 that the second UE trying to reserve the same slot and has priority higher than the priority of the first UE.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the disclosure.

Figure 3:
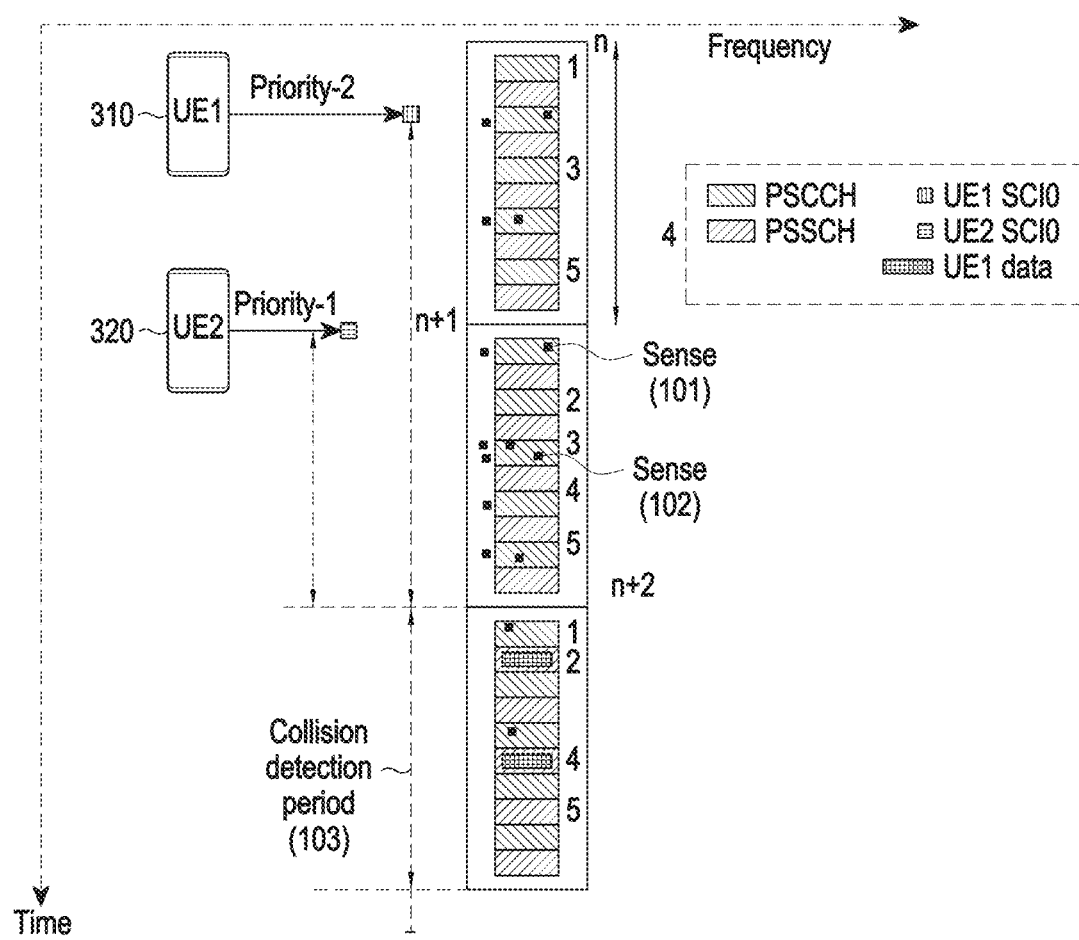
FIG. 3 is a diagram illustrating an example scenario of trying to reserve a slot at a time by two user equipment, according to various embodiments.

FIG. 3 is a diagram illustrating an example scenario of trying to reserve a slot at a time by two user equipment, according to various embodiments.

Consider, the two UEs e.g., UE-1 (310), UE-2 (320) are trying to reserve the slot at same time, where a SA cycle length (Ct) is 5. The UE-1 (310) reaches middle of a SA cycle, whereas the UE-2 (320) is at starting point of the SA cycle. The disclosed method can be used to distinguish the UEs about using a channel extensively for certain time from a major chunk of UEs (310, 320) which use channel occasionally.

When urgent communications are needed, the method can be used to utilize more channel resources based on a user priority in configuration and by override time resource pattern index (TRPI) in side-link control indication (SCI) transmitted by other UEs in a previous sub frames in the same SA period (normal transmissions versus priority transmissions). Slot sharing with negotiation in SCI and rules for slot reservation validity. To avoid slot wastage, every slot is usable by every UE (310) unless the slot is reserved.

Channel Access: The UE (310) is configured with the Ct which is number of SA periods in the single SA cycle. SA cycle can be seen in FIG. 6 with 6 SA periods. When the UE tries to access channel it can be in one of the following conditions.

A UE just started using channel after time synchronization (physical side link synchronization channel). UE should not use reserve slots for a period of at least one complete SA cycle ([Ct, 2*Ct−1] SA periods). If, no UE reserved slot, it can continue to use PRBs in PSCCH which are not reserved.

UE's medium access control (MAC) gets indication from Prose application for slot reservation for a continuous or priority transmission request and trying to reserve a slot and No UE is slot owner.

UE's MAC gets indication from prose application for slot reservation for a continuous or priority transmission request and trying to reserve a slot but it is already reserved.

UE's MAC gets indication from prose application for slot reservation for a continuous or priority transmission request and trying to reserve a slot but facing competition for that slot in the same SA cycle. UE using channel for general communication To reserve a slot, UE has to go through both announcement and Collision detection period (103) to reduce probability of any 2 UEs reserving same slot.

Figures 6, 7:
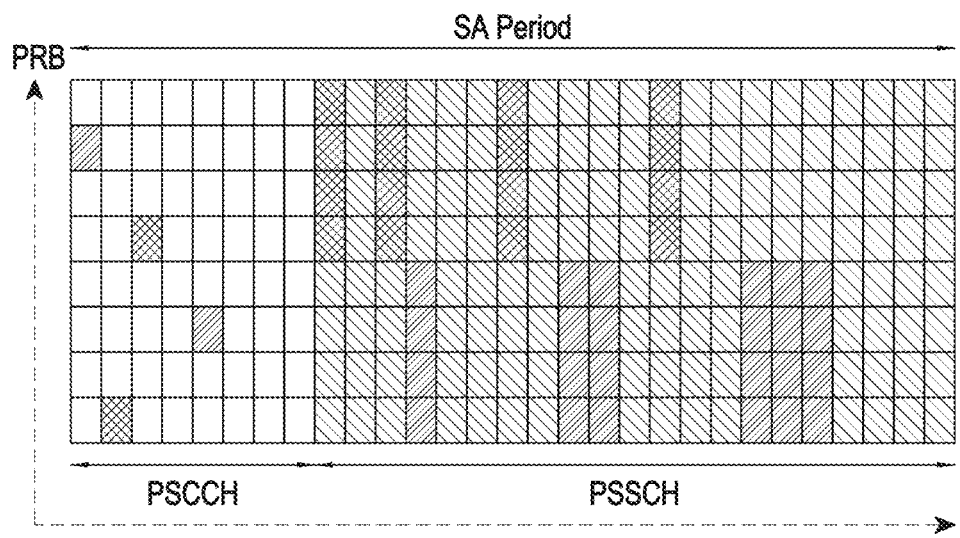
FIG. 6 is a diagram illustrating an example scenario of composing a SA period for a physical layer side link control information (PSCCH) and a physical side link shared channel (PSSCH), according to various embodiments.
FIG. 7 is a diagram illustrating an example scenario of spreading PSSCH, according to various embodiments.

Announcement period: In this period, UE does announcement and in parallel sense (101, 102) the channel. A UE has to announce a complete SA cycle (including $C_t$ SA periods). In FIG. 7 the user can see for UE1 (310) entered in middle of SA cycle n, its announcement period ends at n+1 SA cycle. For UE2 (320) entered at start of n+1 SA cycle, its announcement period ends at n+1 cycle only. The UEs announcement cycle between [$C_t$, 2*$C_t$−1] SA periods. In announcement period UE will not use reserve slot in PSCCH defined in configuration. This is to sense (101, 102) whether the slot is reserved by other UE or not. In order to increase probability of detection, UE will not use all SA periods for announcement period.

Each SA period will be used to announce reservation with probability $P_a$ (announcement probability). Ideal value for $P_a$ is [0.6-0.8] to have fair number of announcements. In FIG. 6, UE1 (310) announces in slot 2, 3, 5 of cycle n and 3, 5 of cycle n+1. This is to give fair chance to all UEs competing in same announcement Cycle. Announcing UE can optionally send data in PSSCH (in that case transmission is not reliable). The UE announces SCIO with ReqSlot (random slot from subFrameReserveSlot-r12) in this case with priority passed from application layer.

Figure 5A:
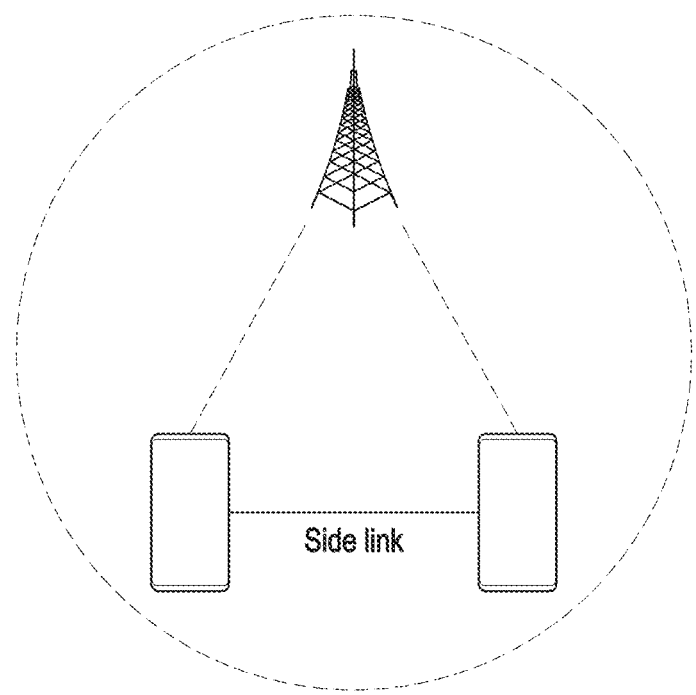
FIG. 5A is a diagram illustrating an example control and data channel path in a mode-1 communication, according to various embodiments.
Figure 5B:
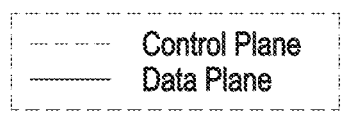
FIG. 5B is a diagram illustrating an example control and data channel path in a mode-2 communication, according to various embodiments.
Figure 5B:
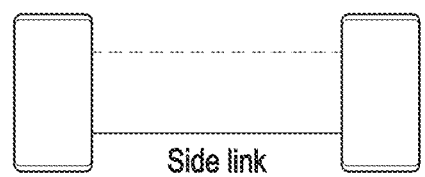

In parallel the UE start sensing to identify if slot is already reserved? If slot is reserved, slot owner announces SCIO at least once in SA cycle as shown in FIG. 5, in reserve slot, with SlotStatus as Reserved (001) indication. In that case, UE need to wait for slot owner to send response with SlotStatus as Accepted (01) & SlotSharingPattern in SA cycle. If slot owner responds with SlotReqStatus as Rejected (10), UE need to back off and restart the whole procedure.

In parallel the UE start sensing to identify if UE senses SlotStatus as NotReserved (000) and other UE is also trying for same slot (ReqSlot in SCIO) at same, UE senses (101, 102) this and back off if Priority field of SCIO of other UE is higher. This is shown in FIG. 6, where UE2 (320) drop because UE1 (310) is having highest priority.

In parallel the UE start sensing to identify if UE does not sense any of the above, sends all announcement and consider slot is partially reserved and proceed to next step.

It is important that, all the UEs need to have reception of this SCI at least once in multiple announcements. Otherwise there is probability of other UEs try to use the slot.

Figure 4:
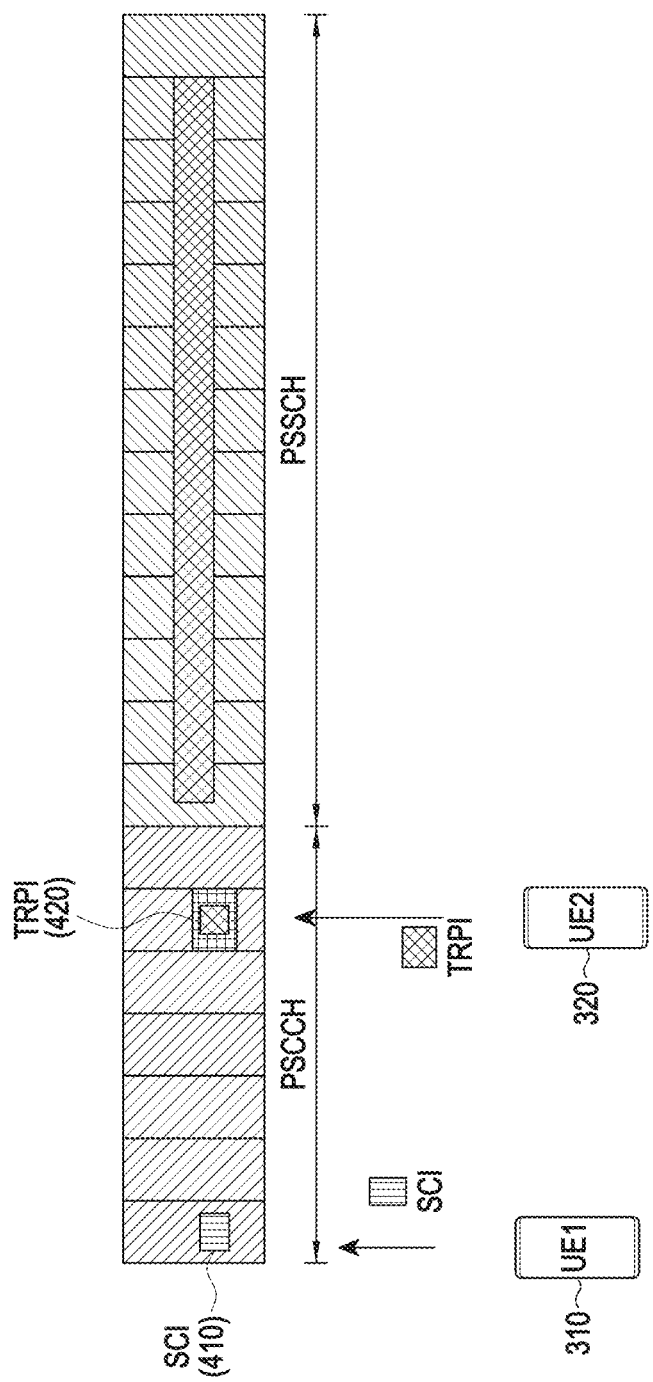
FIG. 4 is a diagram illustrating an example dispatcher overriding side-link control indication (SCI) of a low priority UE for transferring urgent data, according to various embodiments.

FIG. 4 is a diagram illustrating example dispatcher overriding SCI of a low priority UE for transferring urgent data, according to various embodiments.

Referring to FIG. 4, the dispatcher overriding SCI of low priority UE for transferring urgent data.

Channel overriding: When a priority UE in need of bandwidth, and desire to override the SCI (410) announced by other UE (320) in the same SA period, the UE can do so by adding a TRPI (420) with overridden value in the reserved slot. As channel overriding is happening in the reserved slot, normal UE (310) senses the reserved slot and back off transmitting the data in this SA period.

Reservation invalidation: After reserving the slot, any UE need to send a packet at least once in a SA cycle, otherwise both slot owner and all other UE which are sensing the SCI consider the slot is released and use it as regular slot. This will avoid slot wastage if none of the UEs using for priority communications or File distributions.

The flow sequence discloses that the UE needs to do important communication, and need to reserve the slot for communication. Based on the configuration data, the UE knows which slots can be reserved, but needs to verify whether any other UE reserve slot or not. First the UE need to sync with other UEs about SA cycle starting time. Based on the configuration one SA cycle=n*SA periods. At start of the SA cycle, the UE enter into a state called announcement period for one SA cycle (5 SA periods). In this period, the UE keep announcing SCI for slot reservation in random control channel blocks (except possible reserve slots) with probability $P_a$. Meantime, the UE observes configured slots, if any other UE reserved slot or not.

If the UE not observed any other UE reserved slot till end of the announcement period then the UE enters into a collision detection period state for a period of one SA cycle. In collision detection period state, the UE consider itself as a slot owner and starts transmitting information with transmitting probability (Pc). The UE didn't transmit all the SA periods to check if any 2 UE in parallel reserved same slot. If no other UE transmission is observed by the UE, then the UE starts transmitting data in all the SA periods of SA cycle.

Below is example pseudo code as follows—procedure Reserve (L, M, Ct, Pa, Pc, c Frame, priority)

```
..rem = cFrame %Ct
..fSubFrame = curSlot+Ct−1; //choose between Ct and 2*Ct−1
..if rem!=0 then
....fSubFrame = curSlot +2*Ct-rem
..reserved = False
....while cFrame <= fSubFrame do
......if reserved False then
........if (random number between 0 and 1) <= Pa then
..........send announcement in SCI 0 with priority
```

```
........end if
........//Sensing
........reserved = SCI0 reception from owner of the slot
........//reception SCI0 check if other UE trying
........otherUE, _pr = SCI0 with other UE announcement
........if otherUE True and priority <= _pr then
..........return and back off
........end if
......else //Last SA Period sensed that slot already acquired
........//Sense that slot owner responded sharing.
........rejected = SCI0 from slot owner contain rejection of slot
........if rejected True then
..........return and back off
........else
..........if owner accepted read sharing from SCI0 period return success, otherwise continue
........end if
........end if
......cFrame = cFrame+1
....end while // Announcement end and start collision detection
....fSubFrame = cFrame+Ct-1//Collision detection one SA cycle means Ct SA periods
...while cFrame<=fSubFrame do
......if (random number between 0 and 1) <= Pc then
..........send data in this SA period
......else
........//reception SCI0 check if other UE using same slot
........other UE, _pr = SCI0 with other UE announcement
......if other UE True and priority <= _pr then
..........return and back off
........end if
....end while
return success //slot reserved successfully
end procedure
```

FIGS. 5A and 5B are diagrams illustrating an example control and data channel path in mode-1 and mode-2 communication, according to various embodiments.

Referring to FIGS. 5A and 5B consider the disclosed method, the side link D2D communication in the mode-1 happens over sidelink (PC5 interface) with eNodeB (eNB) assistance to schedule the resources (control channel) for the UE (310) to directly transmit data. The eNB allocates dedicated resources for side link communication in uplink spectrum when devices are under coverage as shown in FIG. 6. So there is no problem of collision.

Mode-2 or an out of band D2D have no central coordinator, UE (310) randomly select the resources from preconfigured pool for direct data transfer as shown in FIG. 1. These resource pools are configured to the UE (310) when it is in network. The resource pools are categorized as transmission resource pool and reception resource pool where UE transmits or wait for receptions. Generally, transmission pool is one, but reception pools can be multiple. The structure of side link is same for both modes (mode-2 and mode-2). In the disclosed method, the structure is termed as the SA period of physical side link control channel (PSCCH) for sharing SCI followed by physical side link shared channel (PSSCH) where actual data transmission happens in units of transport blocks.

This is similar to physical downlink control channel and physical downlink shared channel (PDSCH) in on network communications. Main challenge is in the out of band D2D where the channel access is not controlled by any central coordinator. Sample SA period is shown in FIG. 6 in which 2 UEs are trying to transmit. The UE uses ProSe identities to announce which target group (Layer-2 Group ID) this communication refers to and the UE filter out unnecessary communications before passing to above layers.

FIG. 6 is a diagram illustrating an example scenario of composing a SA period for a physical layer side link control information (PSCCH) and a physical side link shared channel (PSSCH), according to various embodiments.

The UE also transmits the TRPI and a modulation scheme in the SCI 0 which is needed for other UEs in order to attain proper data reception in a shared channel. The disclosed method discusses the current design and transmission success probability aspects of it.

FIG. 7 is a diagram illustrating an example scenario of spreading PSSCH, according to various embodiments.

The PSSCH spreads in both time (L) (slot/sub frame [2 slots]) and frequency (M) (PRB). This is determined from subframeBitmap-r12, prb-start-r12 and prb-End-r12field of configured resource pool. In a given resource pool, the PSCCH sub frames need not be consecutive. But within the SA period, all PSCCH sub frames (701, 702) precede the PSSCH. For simplicity, FIG. 7 illustrates consecutive sub frames.

When the data has arrived at the UE, in order to transmit, it picks up the resource randomly based on a random number 'n' (0<n<N). N is determined by number of time slots of PSCCH (L) in the time axis and number of RBs (Resource block) in the frequency axis (M) of PSCCH, which is given as N=L*M/2. Each UE transmits SCI 0 in 2 resource blocks (2 times to improve transmission success probability) which is derived from the value 'n'. Value of n and respective transmission PRBs shown in FIG. 5. In an embodiment, the UEs transmitted SCI failed to receive by other UE if both transmitting and receiving UEs choose 'n' in that SA period such that the selected resources overlap in time axis and both can't listen to each other's transmission, but other UE (320) can receive signal. In another embodiment, the UEs transmitted SCI failed to receive by other UE if both transmitting and receiving UEs choose the same 'n' in that SA period, and due to interference on the same carrier frequency, no other UE can listen to any of these 2 UEs transmissions.

Let $N_{UE}$ represents the number of UEs, which are transmitting in the current cycle. There is detail analysis in for collision probability of n UEs out of $N_{UE}$-1. In MCX the disclosed system need all UEs to receive the SCI, so the method defines the term Pi(S) which is the event when a particular UE is able to transmit and all other UEs are able to successfully receive. Pi(S) is determined using equation-1 given below.

$$P_i(S) = \begin{cases} \left(\dfrac{LM^2 - 4qM - 4(2q+1)r}{LM^2}\right)^{N_{UE}-1} & \text{If } 0 \le r \le (L-1)/2 \\ \left(\dfrac{LM^2 - 4qM - 4(2q-3) + 4(L-1)}{LM^2}\right)^{N_{UE}-1} & \text{if } \dfrac{L-1}{2} < r < L-1 \end{cases} \quad (1)$$

where, $q = \dfrac{M}{2}/(L-1)$ and $r = \dfrac{M}{2} \% (L-1)$.

The method needs to achieve $P_i(S)$ equals to '1' for reliable communications, e.g., a transmitted packet received by all participants. But in practical scenarios the $P_i(S)$ is 0.8 (20% collision) for 50 UEs, 20 slots and 25 RBs and 0.33 (67% collision) if L is reduced by half. Even decent allocation with 20% collision is not acceptable for reliable services like File Distribution.

A platform for mission critical (MC) communications, MC services has been a key priority of 3GPP in recent years. The success of this platform lies in providing large group communications with stringent KPIs of reliability and latency for first responders, in both on network and off network. This platform also provides mechanism to have different priority for users and communications with wide variety of services like voice, video, messaging and File Distribution. Each service plays unique role in different situations. Current Medium access designed for generic purpose doesn't support special requirements of applications like MCX, some of them listed in Table-2.

TABLE 2

MCX Application Requirements and current MAC support in Mode 2 Communications

| | One-one (Private communications) | One-Many (Group communications) |
| --- | --- | --- |
| Real Time(latency critical) Ex: Voice, Video | Packet priority and scheduling in device Introduction of Mode-4 (for V2X in 5G) No coordination between devices. Random channel access | Packet priority and scheduling in device. Introduction of Mode-4 (for V2X in 5G) No coordination between devices. Random channel access |
| Reliability (loss sensitive, Non Real time) Ex: Messaging, File transfer | Application feedback possible. No HARQ feedback. | No HARQ feedback. Application feedback not feasible |
| User priority Ex: Dispatcher | No Support | No Support |

TABLE 2-continued

MCX Application Requirements and current MAC support in Mode 2 Communications

| | One-one (Private communications) | One-Many (Group communications) |
| --- | --- | --- |
| Capitalize Half duplex media | No Support | No Support |

User priority: In MCX, communications from priority users is critical, for example a broadcast message from a dispatcher. Current MAC doesn't provide mechanism to handle user priority in channel access where urgent messages need to be delivered by dispatcher by utilizing more bandwidth and should reach all receivers without collision.

Reliable versus real time: In MCX, voice/video communication need to be real time and packet loss tolerable up to certain limit, while, File Distribution and messaging doesn't need to be real time but require more reliability. A single Channel access mechanism needs to support these 2 requirements. In general cases, this can achieved at application layer, but in Out of band D2D based one-to-many communications, application requesting missing packets is not feasible as this will cause further channel congestion.

Half Duplex Media Transfer: In MCX one-to-many communications, generally only one or two UEs have authority to transfer media at given time instance, which those UEs continue to transmit for certain time. In such cases, contending for channel for every packet is burden and current medium access doesn't capitalize on this behavior. It gives same priority for channel access for all UEs which are doing continuous transmission and occasional transfer. In off network, devices are designed to use single application (MCX) but current channel access does not cater to specific application requirements.

New medium access: Anew medium access suitable for MCX application requirements. For simplicity, whenever the user uses the term File Distribution its high Reliability expected service and term Dispatcher refers high Priority User. These terms will be used inter-changeably. Further the word communication refers to Mode-2 D2D communication, unless explicitly mentioned otherwise.

In order to capitalize half-duplex mode of communication, and to support collision-free communications for Reliability, the method discloses a slot reservation mechanism where UE acquires and releases slot with procedures mentioned in subsequent sections and use it till end of transmission.

The method to distinguish UEs (310, 320) which use channel extensively for certain time (either Floor arbitrator in voice communication, or File Distribution) from major chunk of UEs which uses channel occasionally to include user priority in configuration to utilize more channel resources when required for urgent communications by overriding TRPI in SCIO transmitted by other UEs in the previous sub frames in the same SA period. Slot sharing with negotiation in SCI rules for slot reservation validity. To avoid slot wastage, every slot is usable by every UE unless it is reserved The resource pools are configured with reserve slots. The priority comes from Prose based on service or user. These slots should be limited to 10% of total PRBs allocated for PSCCH. For example for L=8, M=25, the reserved slots should be limited to (8*25/2) %10. SCI structure as detailed in 3GPP 36.212 is modified to include optional parameter-slot reserve status, to identity if a slot is reserved or not, some UE trying to reserve slot, etc.

A SCI format configuration changes is: newly added parameters in extension to 36.212 related to SCI format are color coded in shared document, due to grey color images, those changes missing to explain further about UE announce or monitor SCI in control channel for information related to channel usage. So to reserve slot in SCI, the existing format detailed in 36.212 extended with Reqslot and priority filed. Similarly to monitor channel requests for slot reservation requests SCI is extended with SlotStatus, SlotReqStatus and SlotSharingPattern FIG. 8 is a diagram illustrating example representations of a full collision, a double overlap and a no collision, according to various embodiments.

Figure 8:
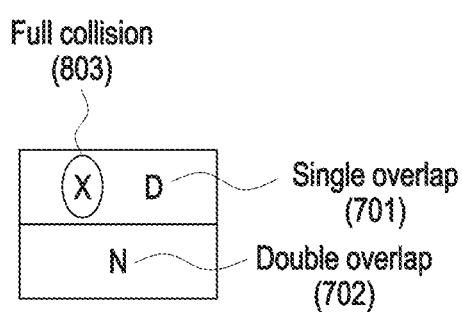
FIG. 8 is a diagram illustrating example representations of a full collision, a double overlap and a no collision, according to various embodiments.

Referring to FIG. 8 the Full collision X (803), Double overlap D and no collision (single/no overlap). The disclosed method, defines the probability $E^n$ of the event where 'n' UEs out of N−1 UEs missed the slot request announcement due to collision. In order to have collision, the receiving UE either choose same resource as transmitted, in which case all other UEs also will miss this announcement in that SA period, the method defines this as X. Other case is, double overlap (702), the disclosed system defines this as D, if this happens receiving UE misses the transmission. Next is no overlap and single overlap (701), in which case receiving UE at least once receives the announcement. For multiple announcement requests by transmitting UE, if receiving UE receives at least one of the SA period, then it is considered as successful reception.

K reserved slots pre-configured in device cannot be used by reserving UE and it transmits with Pa probability in announcement cycle. All other UEs transmits in each slot with Pt probability. Out of $C_t*P_a$ announcements transmitted by UE, probability of a receiver missing in all occasions is defined as P(E), is conditioned receiver transmitting probability P(R). P(C|R) is probability of collision happened given receiving UE transmits in same SA period.

$$P(E) = (P(C|R)*P(R) + P(C|\overline{R})*P(\overline{R}))^{C_t*P_a} \quad (2)$$

where $P(C|R) = P(X) + P(D \cap \overline{X})$ meaning probability of collision when both transmitting and receiving UEs using SA period combination of Full collision P(X) or Double overlap $P(D \cap \overline{X})$.

$P(C|\overline{R}) = P(X)$ may refer, for example, to receiving UE did not receive when it is not transmitting in that SA period. This happens when Full collision P(X) happens due to other transmitting UEs in that SA period. P ($D \cap \overline{X}$) is explained.

$$P(E) = ((P(X) + P(D \cap \overline{X}))P_t + P(X)(1 - P_t)) \quad (3)$$

$$P(E) = P(X) + P(D \cap \overline{X})*P_t \quad (4)$$

$E^n$ is the event where n UEs missed receiving reserving SCI in all announcements. $E^n$ follows binomial distribution between collision and non-collision events and all UEs independently choose the resources in each SA period.

$$P(E^n) = \quad (5)$$

$$\binom{N-1}{n}(P(E) - \nabla(n)*P(X)^{C_t*P_a})^n * (1 - P(E) - \nabla(n)*P(X)^{C_t*P_a})^{N-1-n}$$

$$\text{where } \nabla(n) = \begin{cases} 1 & \text{when } n \mathrel{!}= N - 1 \\ 0 & \text{otherwise} \end{cases}$$

$$\text{and } P(X) = \left(1 - \left(1 - \frac{1}{N-K}\right)^{N-1}\right) \quad (5)$$

$\nabla(n)$ is to cancel out possibility of Full collision in all the announcement slots, in which case, none of the UEs receive the announcement, this is possible only for $E^{N-1}$.

Collision detection period: In this period, the UE considers itself as slot owner and starts using reserved slot for SCI transmission and send data in PSSCH. It fills SlotStatus as Reserved (001) while announcing SCI. To detect this, the UE skips usage of few SA periods in this cycle. It uses each SA period only with probability PC (PC<1) to detect if any collision happened in announcement period. For example if 2 UEs reserve same slot in announcement period, the disclosed system can detect collision with probability, $$\text{collision detection prob} = \frac{(Ct*Pc)*(C_{t-1}C_{t-1}*Pc)}{(C_tC_t*Pc)^2} \quad (6)$$

Collision analysis: The start of the File Distribution services in each SA cycle follows poison distribution with load a. Probability of starting K transmissions in a given SA cycle is given by $$P(K = k) = \frac{e^{-a} * a^k}{k!} \quad (7)$$

'n' UEs enter collision with probability $P(E^n)$ as derived. As $Pt << P_a$, the UEs coming out of collision will be mostly those UEs which are trying for slot reservation, ignoring normal UEs for simplicity. Now, the method defines event S for successful reservation slot $$P(S) = \quad (8)$$

$$1 - \frac{1}{P(K=1)*n} \sum_{l=2}^{N} P(K=l)*l*P(E^l)*(1 - \frac{C_t*P_c*(C_{t-1}C_{t-1}*P_c)^{l-1}}{(C_tC_t*Pc)^2}$$

Where UE transmits Ct*Pc slots, probability of choosing $$\frac{1}{(C_tC_t*Pc)}$$

and other UEs choose $$1/(C_{t-1}C_{t-1}*P_c)^{l-1}$$

and P(K=l)<<P(K=1) due to the fact that 1 file distributions start in 400 msec. normalized with P(K=1), as the disclosed system need to calculate success probability when at least one UE reserving slots.

Figure 9:
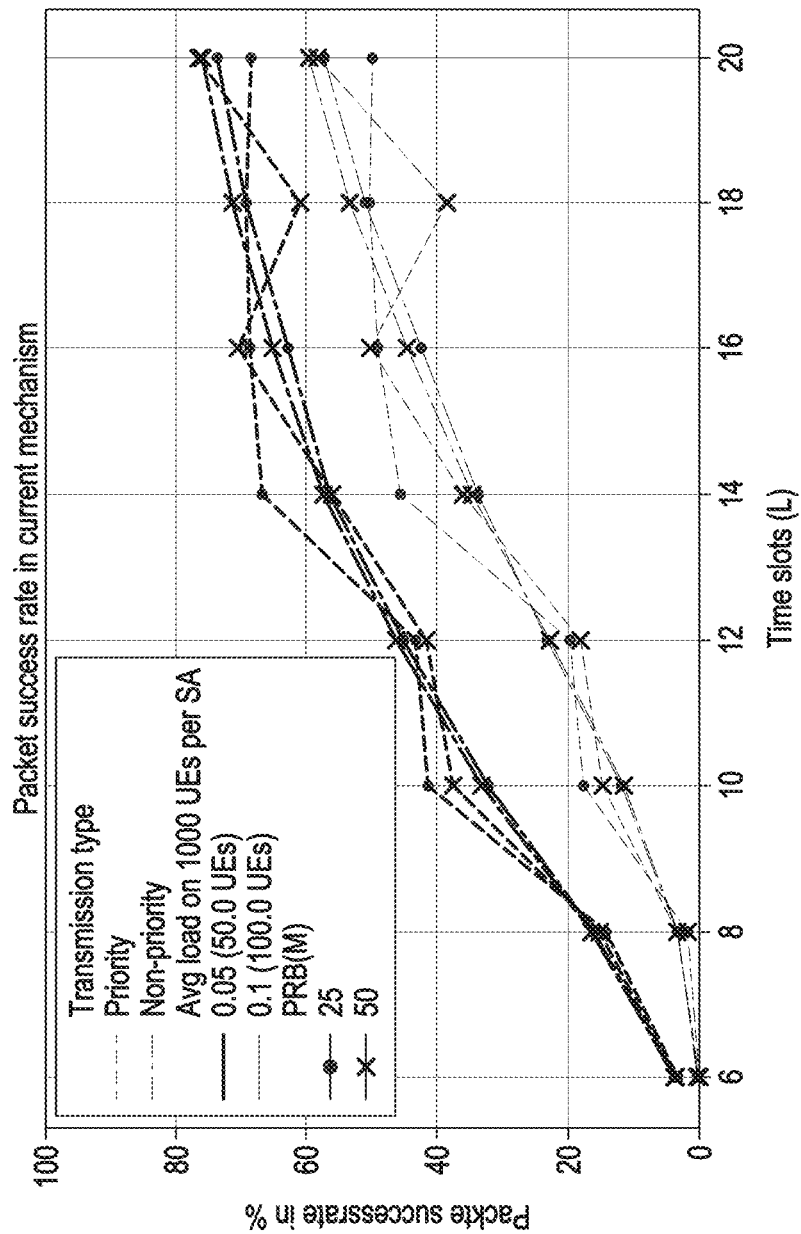
FIG. 9 is a graph illustrating example packet success rate in conventional system, according to various embodiments.

FIG. 9 is a graph illustrating example packet success rate in conventional system, according to various embodiments.

Referring to FIG. 9 consider the disclosed method, simulations are performed using a network simulator with 1000 UEs in the network. Set different load on the network 0.05 and 0.1 (on an average 1000*load number of UEs participating in each SA period) with varying number of time slots L (6 to 20) and PRB M (25, 50) 5 MHZ and 10 MHZ band. Experiments repeated over 10000 times with each configuration captured average packet loss and results are depicted in figure.

The user can observe that even with good L (20), M (50) and network load (0.05) there is approximately 20% packet loss which is not acceptable for File Distribution kind of services. If the network load increases, the user can see packet loss of 50% for priority communications (or File distributions).

Now, to evaluate the disclosed solution the method divided experiments into 2 parts. One is slot reserving success rate which observed close to 99.99% with decent L and M, and for huge network load (0.2). Once the slot is reserved, the disclosed method introduces a new UEs in between file transmission and observed whether the new UE is able to recognize the reserve slot 100% or not.

To check slot reservation mechanism with disclosed method, the user considered one reserve slot and multiple UEs started file distribution in same announcement cycle and if more than 2 UEs become the slot owner at end of collision detection period as mentioned, consider this as reservation failure. The user tried with different configurations, L (10, 15, and 20 time slots) and M (25 and 50 PRB), Cycle length Ct (5 and 10 SA periods) and different network loads (0.05, 0.1 and 0.2 probability packet arrival for each UE in each SA). The method fixes $P_a$ as 0.8 and Pc as 0.5 as described.

Figure 10:
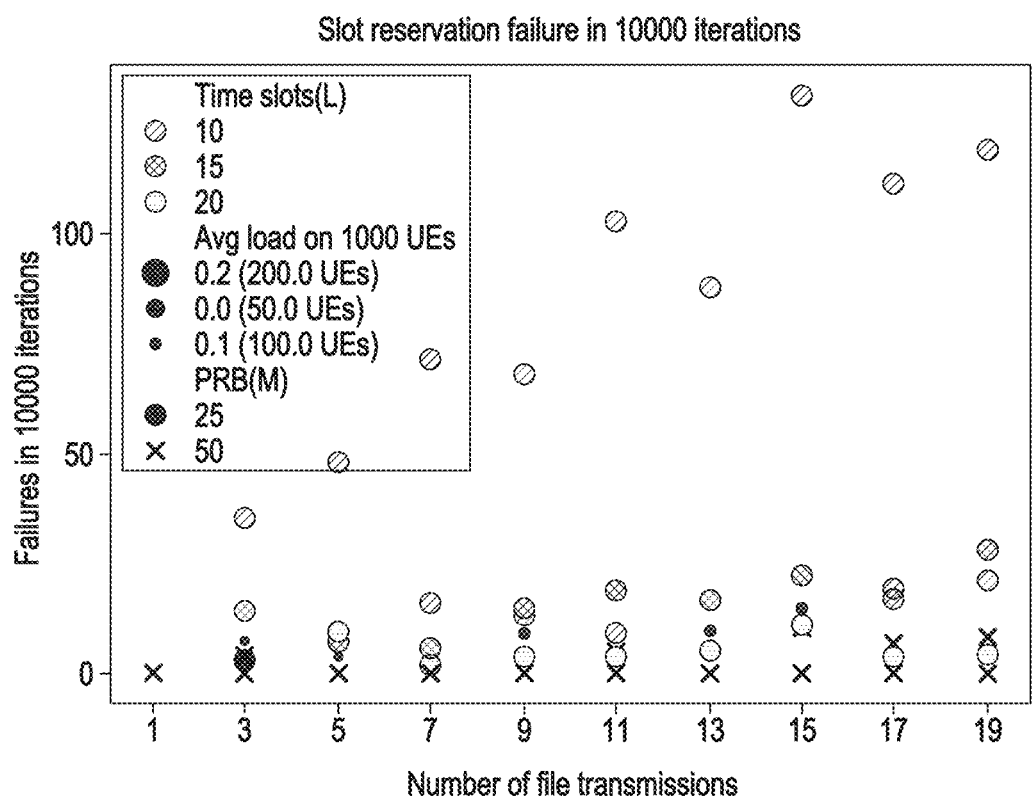
FIG. 10 is a graph illustrating an example slot reservation failure in varying network load, according to various embodiments.

FIG. 10 is a graph illustrating an example slot reservation failure in varying network load, according to various embodiments.

Referring to FIG. 10 consider a method, calculated over 10000 iterations, plots number of file transmissions starts in a single Announcement cycle versus Failures in reservation slot, over 10000 iterations. The user can see failure rate of just 1% with high network load of 0.2, M is 25 and Low L, Ct, and ~20 transmissions started in 0.5 sec (L=10) which is very rare. With decent network load in MCX, the user can expect failures in reservation strictly close to 0.01%.

Figure 11:
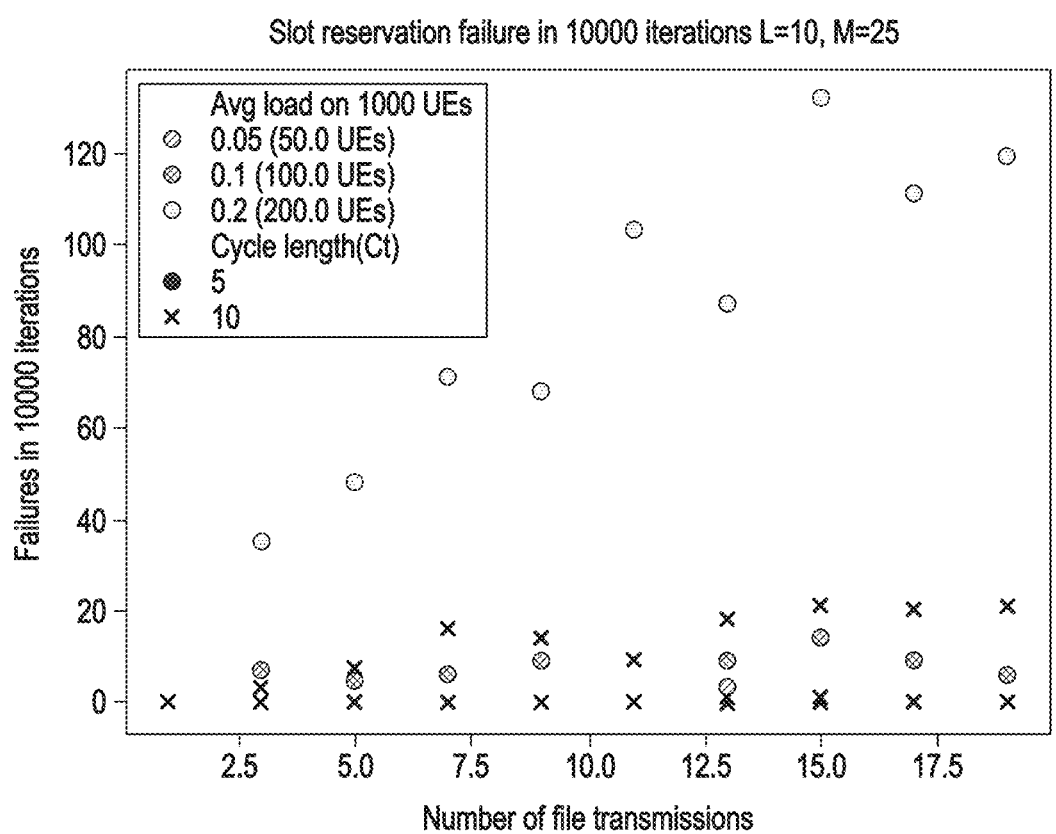
FIG. 11 is a graph illustrating an example slot reservation failure in varying Network load at 10 slots and 25 subcarrier, according to various embodiments.
Figure 13:
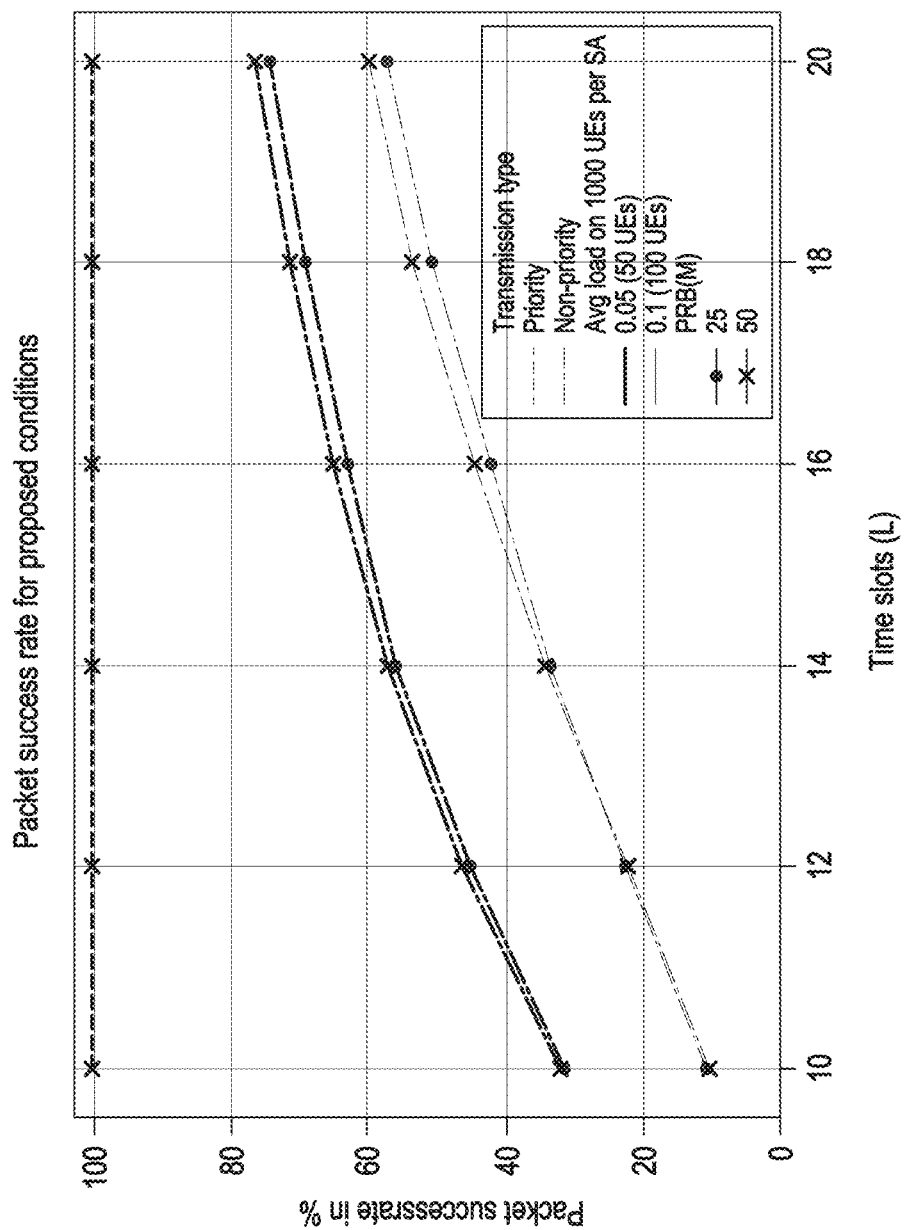
FIG. 13 is a graph illustrating an example packet success rate calculated for change for a non-priority and file distribution, according to various embodiments.

With decent configuration which usually used in commercial products with network load of 0.1 and cycle length of 10, the user can see <10 failures in 10000 file distributions as depicted in FIG. 11. With good configuration this number still goes very low as shown in FIG. 13 even for 20 file transmissions in 1 sec.

FIG. 11 is a graph illustrating an example slot reservation failure in varying Network load at 10 slots and 25 subcarrier, according to various embodiments.

FIG. 11 is a derivate of FIG. 10 explaining about number of slot reservation attempt failures, calculated over 10000 iterations, with a solution with difference in configuration of L and M. FIG. 10 is with slot L=10 and sub carrier M=25. The failures in reserving slots are little higher compared to FIG. 11.

Figure 12:
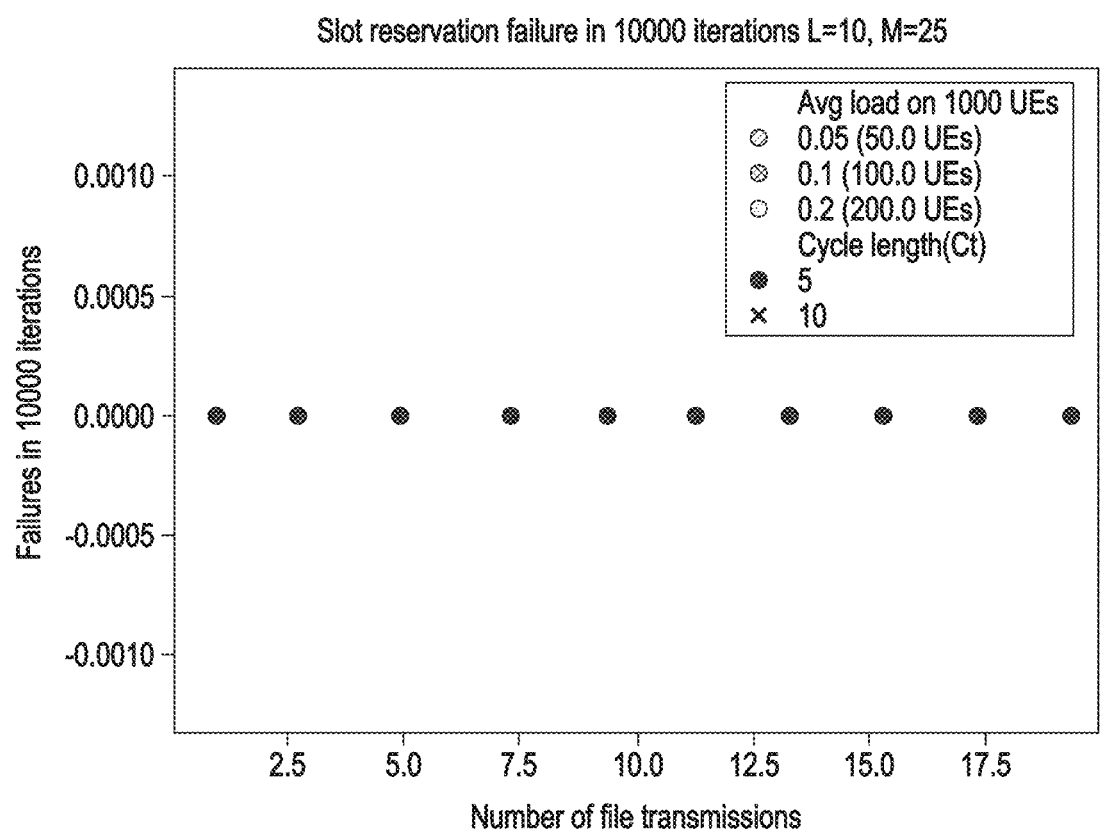
FIG. 12 is a graph illustrating an example slot reservation failure in varying network load at 20 slots and 50 subcarrier, according to various embodiments.

FIG. 12 is a graph illustrating an example slot reservation failure in varying network load at 20 slots and 50 subcarrier, according to various embodiments.

FIG. 11 is a derivate of FIG. 10 explaining about number of slot reservation attempt failures, calculated over 10000 iterations, with the solution with difference in configuration of L and M. FIG. 12 depicting result for moderate configuration of L=20, M=50 where slot reservation failures are very close to 0%.

FIG. 13 is a graph illustrating an example packet success rate calculated for change for a non-priority and file distribution, according to various embodiments.

Referring to FIG. 13 consider the disclosed method, once slot reservation is successful and UE continued the file distribution in that slot, in between new UE joins and leaves the network. But the File distribution in reserved slot is completed successfully in all 10000 iterations. With this approach, packet success rate of normal communications (80% best case) is not changed even after slot is reserved and not usable for normal communication. This is due to the fact that the UE doing File distribution is not causing any collision for other UEs.

In general, any UE is limited to one application usage at a time, Mode-2 D2D communications channel access should be customizable to the application for reliability. The disclosed method started with explaining the current medium access in Mode-2 and its limitation to cater the MCX requirements and disclosed a new medium access mechanism which provides robust approach to reserve slots for critical, reliable communications, with combination of pre-configured resources and channel sensing in SA cycle. Results are very promising in achieving 99.95 percent success rate in reserving slot there by achieving collision free file distributions compared to <50% success rate without new access mechanism for a network load of 0.1.

The disclosed method also provides channel overriding mechanism to cater to latency requirement and better channel utilization by priority users.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method for performing communication in a mission critical services (MCX) off-network, wherein the method comprises:
    sending, by a first user equipment (UE) in the MCX off-network, an announcement message for a slot reservation in a channel for a complete scheduling assignment (SA) cycle; and
    determining, by the first UE, whether a second UE in the MCX off-network is trying to reserve a same slot and having a higher priority than a priority of the first UE;
    performing, by the first UE, one of:
    backing off and sending a new announcement message for the slot reservation, in response to determining that the second UE is trying to reserve the same slot and has the higher priority than the priority of the first UE, and
    reserving the same slot, in response to determining that the second UE is trying to reserve the same slot and has a lower priority than the priority of the first UE,
    wherein the announcement message is sent with an announcement probability in each SA cycle in non-configured slots.

2. The method of claim 1, wherein reserving the same slot, in response to determining that the second UE is trying to reserve the same slot and has priority a lower priority than the priority of the first UE comprises:
    determining, by the first UE, whether the same slot is already reserved by the second UE in the MCX off-network; and
    performing, by the first UE, one of:

reserving the same slot in response to determining that the same slot is not already reserved by the second UE in the MCX off-network, and transmitting data using the reserved slot for the complete SA cycle with a transmitting probability in each SA, and sharing the reserved slot with the second UE in response to determining that the same slot is already reserved by the second UE in the MCX off-network.

3. The method of claim 2, wherein sharing the reserved slot with the second UE in response to determining that the same slot is already reserved by the second UE in the MCX off-network comprises:

sending, by the first UE, a slot sharing request for a slot configuration in non-configured slots to the second UE that reserved the same slot;

determining, by the first UE, whether a slot sharing response is received from the second UE that reserved the same slot;

performing, by the first UE, one of:

sharing the reserved slot with the second UE in response to receiving the slot sharing response from the second UE that reserved the same slot, and backing off and sending the new announcement message for the slot reservation in response to receiving the slot sharing response from the second UE that reserved the same slot.

4. The method of claim 1, wherein backing off and sending a new announcement message for the slot reservation, in response to determining that the second UE is trying to reserve the same slot and has the higher priority than the priority of the first UE comprises:

sending, by the first UE, the announcement message for the slot reservation for the complete SA cycle with the announcement probability in each SA cycle in the non-configured slots;

reserving, by the first UE, the same slot after sending announcement message for the SA cycle;

utilizing, by the first UE, the reserved slot for a data announcement for a next complete SA cycle with the transmitting probability in each SA cycle;

monitoring, by the first UE, whether the second UE reserved the same slot and has the higher priority than the priority of the first UE;

performing, by the first UE, one of:

backing off and sending the new announcement message for the slot reservation, in response to determining that the second UE reserved the same slot and has the higher priority than the priority of the first UE, and utilizing the same slot continuously for communication in response to determining that the second UE reserved the same slot and has the lower priority than the priority of the first UE.

5. The method of claim 1, further comprising:

detecting, by the first UE, a critical data to be transmitted in the channel;

determining, by the first UE, the same slot is already reserved by the second UE in the MCX off-network; and performing, by the first UE, one of:

overriding the reserved slot in response to determining that the second UE has the lower priority than the priority of the first UE, and backing off and sending the new announcement message for the slot reservation in response to determining that the second UE reserved the same slot and has the higher priority than the priority of the first UE.

6. The method of claim 1, wherein the slot reservation cannot be achieved without sending the announcement message for the SA cycle.

7. The method of claim 1, further comprising:

detecting, by the first UE, a critical data to be transmitted in the channel;

sending, by the first UE, the announcement message for the complete SA cycle;

reserving, by the first UE, a control channel positioned at an end of a control block of a SA period of the SA cycle;

overriding, by the first UE, the control channel announced by the second UE which has the lower priority than the priority of the first UE; and utilizing, by the first UE, extra data channel resources in response to overriding the control channel.

8. A first user equipment (UE) for performing communication in a mission critical services (MCX) off-network, wherein the first UE comprises:

a memory;

at least one processor; and a service management controller, coupled to the memory and the processor, configured to:

send an announcement message for a slot reservation in a channel for a complete scheduling assignment (SA) cycle; and determine whether a second UE in the MCX off-network is trying to reserve a same slot and having a higher priority than a priority of the first UE;

perform one of:

back off and sending a new announcement message for the slot reservation in response to determining that the second UE trying to reserve the same slot and has the higher priority than the priority of the first UE, and reserve the same slot in response to determining that the second UE is trying to reserve the same slot and has a lower priority than the priority of the first UE, wherein the announcement message is sent with an announcement probability in each SA cycle in non-configured slots.

9. The first UE of claim 8, wherein the service management controller is further configured to:

determine whether the same slot is already reserved by the second UE in the MCX off-network; and perform one of:

reserve the same slot in response to determining that the same slot is not already reserved by the second UE in the MCX off-network, and transmitting data by the first UE using the reserved slot for the complete SA cycle with a transmitting probability in each SA, and share the reserved slot with the second UE in response to determining that the same slot is already reserved by the second UE in the MCX off-network.

10. The first UE of claim 9, wherein the service management controller is further configured to:

send a slot sharing request for a slot configuration in the non-configured slots to the second UE that reserved the same slot;

determine whether a slot sharing response is received from the second UE that reserved the same slot;

perform one of:

share the reserved slot with the second UE in response to receiving the slot sharing response from the second UE that reserved the same slot, and back off by the first UE and sending a new announcement message for the slot reservation in response to receiving the slot sharing response from the second UE that reserved the same slot.

11. The first UE of claim 8, wherein the service management controller is further configured to:
send the announcement message for the slot reservation for the complete SA cycle with the announcement probability in each SA cycle in non-configured slots;
reserve the same slot after sending announcement message for the SA cycle;
utilize the reserved slot for a data announcement for a next complete SA cycle with the transmitting probability in each SA cycle;
monitor whether the second UE reserved the same slot and having the higher priority than the priority of the first UE;
perform one of:
back off and send the new announcement message for the slot reservation in response to determining that the second UE reserved the same slot and has the higher priority than the priority of the first UE, and
utilize the same slot continuously in response to determining that the second UE reserved the same slot and has the lower priority than the priority of the first UE.

12. The first UE of claim 8, wherein the service management controller is further configured to:
detect a critical data to be transmitted in the channel;
determine the same slot is already reserved by the second UE in the MCX off-network; and
perform one of:
override the reserved slot in response to determining that the second UE has the lower priority than the priority of the first UE, and
back off and sending the new announcement message for the slot reservation in response to determining that the second UE reserved the same slot and has the higher priority than the priority of the first UE.

13. The first UE of claim 8, wherein the slot reservation cannot be achieved without sending the announcement message for the SA cycle.

14. The first UE of claim 8, wherein the service management controller is further configured to:
detect a critical data to be transmitted in the channel;
send the announcement message for the complete SA cycle;
reserve a control channel positioned at an end of a control block of a SA period of the SA cycle;
override the control channel announced by the second UE has the lower priority than the priority of the first UE; and
utilize extra data channel resources in response to overriding the control channel.

* * * * *